US006467545B1

(12) United States Patent
Venkataraman et al.

(10) Patent No.: US 6,467,545 B1
(45) Date of Patent: Oct. 22, 2002

(54) MONOLITHIC ISOLATION STRESS JOINT

(75) Inventors: Gouri Venkataraman, Sugar Land; Vidish Subba Rao; Robert Henry Wittman, both of Houston; Richard Bryan Lee, Spring, all of TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/563,471

(22) Filed: May 2, 2000

Related U.S. Application Data
(60) Provisional application No. 60/132,142, filed on May 2, 1999.

(51) Int. Cl.[7] .......................... E21B 17/01; E21B 17/02
(52) U.S. Cl. ........................ 166/367; 166/355; 405/195
(58) Field of Search ................................ 166/367, 359, 166/346, 345, 355; 405/195.1, 224.3

(56) References Cited

U.S. PATENT DOCUMENTS

| 3,727,954 A | * | 4/1973 | Oliver ......................... 285/168 |
| 4,188,156 A | | 2/1980 | Fisher et al. ................. 405/195 |
| 5,133,578 A | * | 7/1992 | Whightsil, Sr. et al. ..... 285/166 |
| 5,269,629 A | | 12/1993 | Langner ................... 405/195.1 |
| 5,336,020 A | * | 8/1994 | Askestad ..................... 405/224 |
| 5,447,392 A | | 9/1995 | Marshall .................. 405/224.4 |
| 5,615,977 A | * | 4/1997 | Moses et al. ............ 405/195.1 |
| 5,873,677 A | * | 2/1999 | Davies et al. ............ 405/195.1 |
| 5,887,659 A | * | 3/1999 | Watkins ....................... 166/350 |

* cited by examiner

Primary Examiner—Hoang Dang

(57) ABSTRACT

A monolithic isolation stress joint is disclosed having a first conduit element, a first insulating joint assembly, and a stress joint connected to the first conduit element through the first insulating joint assembly. The stress joint is formed of a material which has advantageous elastic flexure characteristics but which is electrochemically active with respect to the first conduit element from which it is electrically isolated by the first insulating joint assembly. A second conduit element is connected to the stress joint through a second insulating joint assembly, the second conduit element being formed of a material which is electrochemically active with respect to the stress joint and which is electrically isolated therefrom with the second insulating joint.

20 Claims, 3 Drawing Sheets

MONOLITHIC ISOLATION STRESS JOINT

This application claims the benefit of U.S. Provisional Application No. 60/132,142 filed May 2, 1999, the entire disclosure of which is hereby incorporated by reference.

BACKGROUND OF THE INVENTION

The present invention relates to a method and apparatus for terminal connection for highly tensioned tubular conduits. More particularly the present invention relates to a method and system for flexibly connecting pressurized, highly tensioned tubular elements across a joint that must accommodate relative motion between its joined ends. The present invention will be seen to have particularly beneficial application to risers extending from subsea facilities to compliant structures in the development of offshore oil and gas reserves.

Traditional bottom-founded platforms having fixed or rigid tower structures have been taken to their logical depth limits in the development of offshore oil and gas reserves. Economic considerations suggest that alternatives to this traditional technology be used in the development of deep-water prospects and various "compliant structures" have been proposed or developed. Among these alternatives are tension leg platforms, compliant towers, articulated towers, floating production facilities, tension leg well jackets, and spar structures. Common to these alternatives is the fact that surface facilities supported by the platform are in relative motion with subsea facilities. Thus, the high pressure conduits, e.g., import, export, and production risers, that connect the subsea and surface facilities in the transport of hydrocarbons must accommodate constant relative motion. Further, these conduits may well be 1000 meters or more long and surface support may highly tension the conduits at their platform termination.

Flexible joints have been developed to accommodate this relative motion. However, these components combine exotic materials in complex manufacturing operations and prove relatively expensive to acquire. Further, the dynamic service life of flexible joints may prove less than that of the risers or of the platform. This may require additional maintenance for the riser, at least in replacement of these components. Such flexible joint applications are illustrated in U.S. Pat. No. 5,269,629 issued to Langner on Dec. 14, 1993 and U.S. Pat. No. 5,447392 issued to Marshall on Sep. 5, 1995.

Titanium stress joints theoretically have the necessary fatigue life, but titanium is too expensive for the overall riser application and proves susceptible to service problems when placed in seawater in combination with steel riser sections and other adjacent subsea and platform components. A titanium alloy stress joint subject to these problems is illustrated by U.S. Pat. 4,188,156 issued to Fisher et al on Feb. 12, 1980.

Thus, there remains a need for a simple termination or joint to accommodate relative motion at terminations in conduits for high pressure, high load applications.

SUMMARY OF THE INVENTION

Toward providing these and other advantages, the present invention is a monolithic isolation stress joint having a first conduit element, a first insulating joint assembly, and a stress joint connected to the first conduit element through the first insulating joint assembly. The stress joint is formed of a material which has advantageous elastic flexure characteristics but which is electrochemically active with respect to the first conduit element from which it is electrically isolated by the first insulating joint assembly. A second conduit element is connected to the stress joint through a second insulating joint assembly, the second conduit element being formed of a material which is electrochemically active with respect to the stress joint and which is electrically isolated therefrom with the second insulating joint.

BRIEF DESCRIPTION OF THE DRAWINGS

The brief description above, as well as further advantages of the present invention will be more fully appreciated by reference to the following detailed description of the preferred embodiments which should be read in conjunction with the accompanying drawings in which:

FIG. 4 is a cross sectional view of a second insulating joint in accordance with another embodiment of the present invention.

DETAILED DESCRIPTION OF ILLUSTRATIVE EMBODIMENTS

Figure 1:
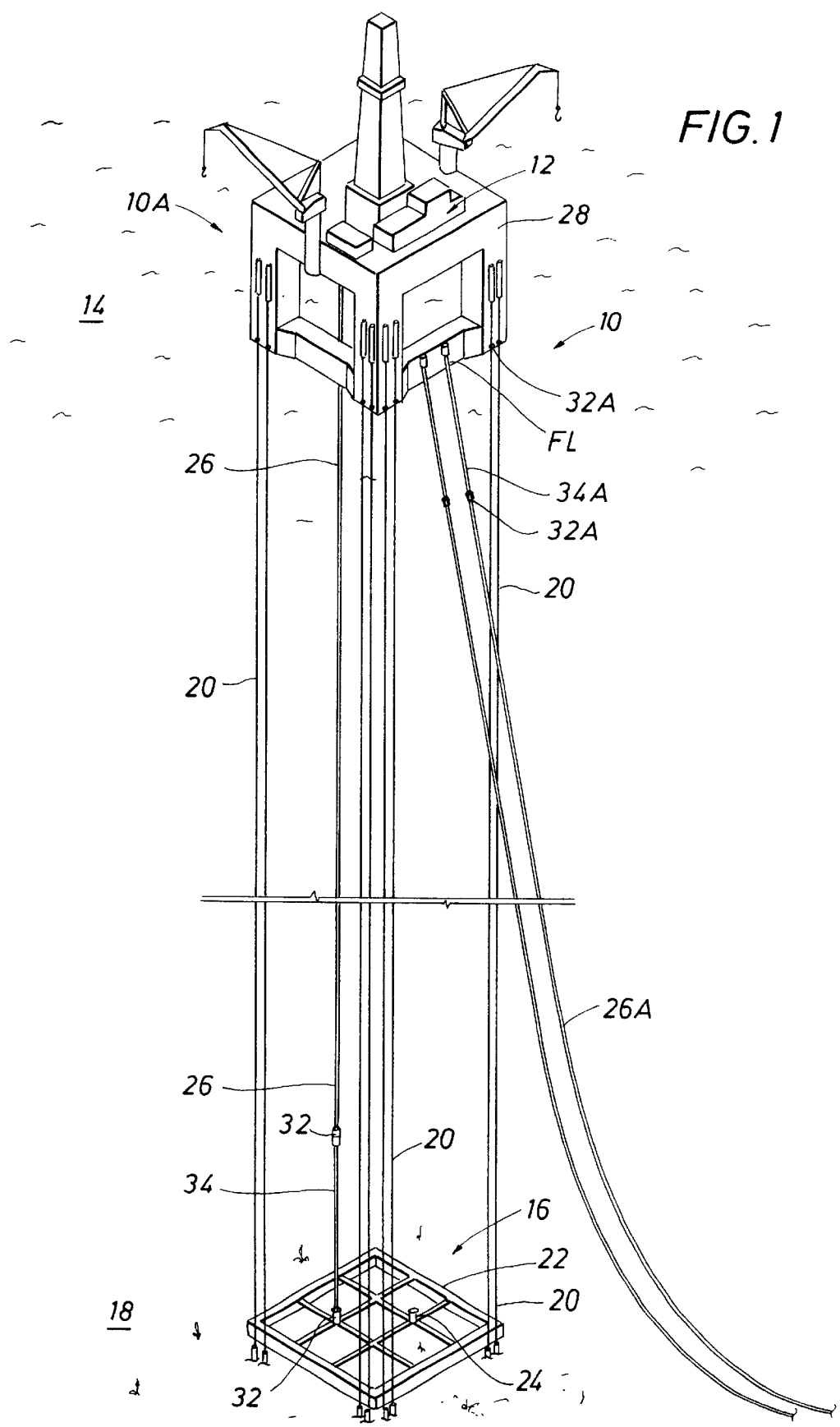
FIG. 1 is an isometric view of an environment for the application of the present invention.

FIG. 1 illustrates an environment to which the present invention is particularly well suited. Here an offshore compliant platform 10 in the form of tension leg platform ("TLP") 10A provides surface facilities 12 above ocean surface 14 and subsea facilities 16 at ocean floor 18. TLP 10A is secured to ocean floor 18 through a plurality of tendons 20 at a template 22 which is secured in place with a plurality of piles (not shown). Template 22 also provides a framework for spacing wells 24.

One of wells 24 is illustrated with a steel production riser 26 to conduct well fluids to surface facilities 12. The production riser is substantially vertical and is dynamically tensioned at its upper end. Environmental forces cause hull 28 of TLP 10A to drift and this translates to bending moments at the lower end of production riser 26. Stress joint 30 helps retain structural integrity and maintain an adequate fatigue life in light of this loading. The stress joint is provided with monolithic isolation stress joints 32 on either end of titanium tapered transition section 34.

The production of remote satellite wells (not shown), often with subsea completions, can be connected to surface facilities 12 through import risers 26A. Here the import risers are steel tubular goods arranged in a catenary lie from resting on seafloor 18 to engagement in baskets 54 carried on pontoons 10B of TLP 10A. Similarly, export risers 26B carry produced and initially processed hydrocarbons to a subsea pipeline.

Figure 2:
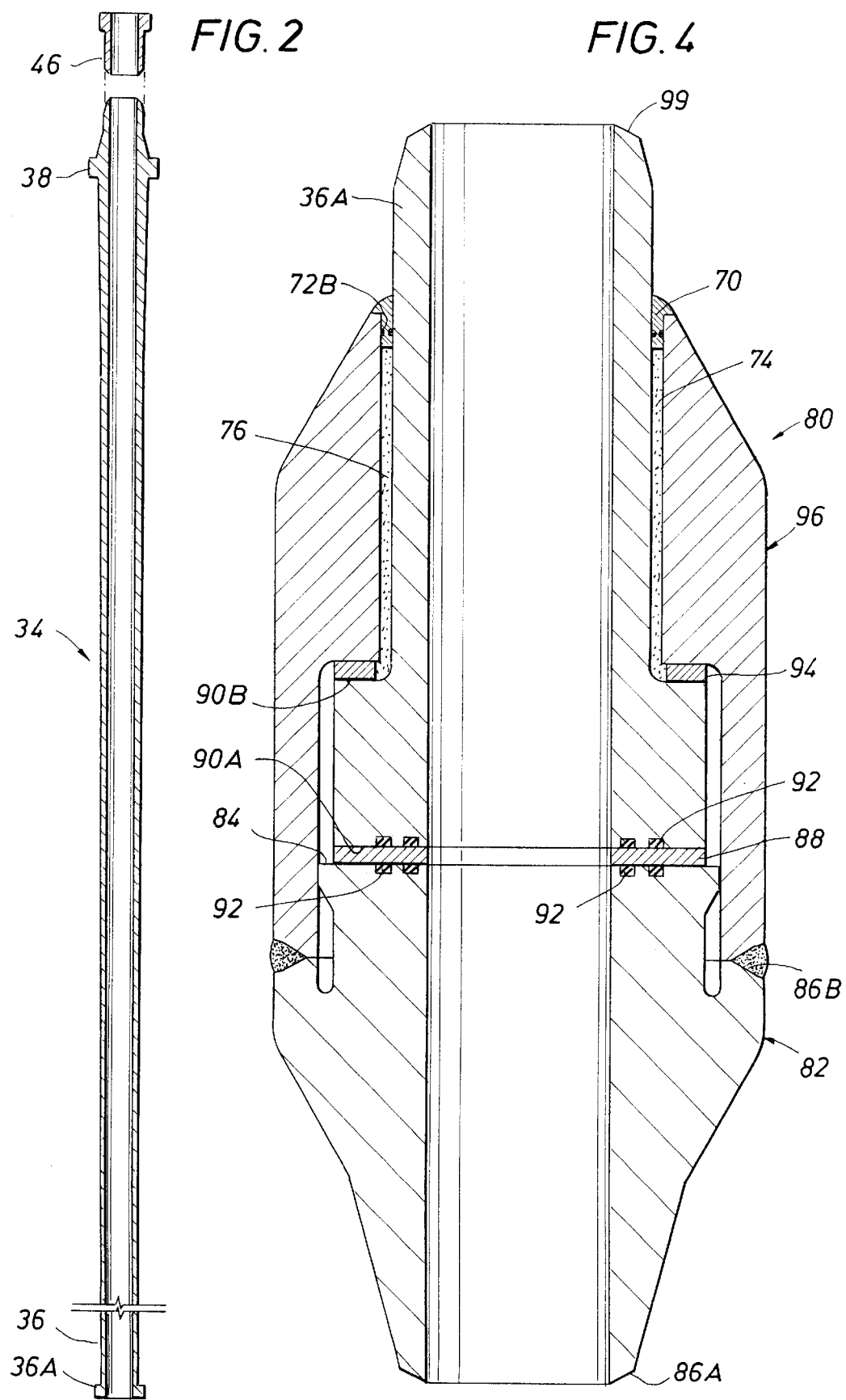
FIG. 2 is a side elevational view of a stress joint in the form of a tapered transition section.

FIG. 2 is a side elevational view of tapered transition section 34 as a component of a monolithic stress joint 32 to be assembled in one embodiment of the present invention. Tapered transition section 34 is formed of a material which has advantageous elastic flexure characteristics combined with strength and durability. Titanium alloys such as Ti6Al-4V ELI may be useful for rigorous offshore environments such as riser applications in the illustrated embodiments. However, such materials are very expensive and difficult to fabricate into complex shapes. Therefore it is not desired to make the overall riser from such alloys and provisions must be made to connect the titanium elements of the stress joint into the steel riser, e.g., catenary riser 26A of FIG. 1. Further, the critical bending stresses requiring such stress joint applications concentrate at the connection points, e.g., at seafloor such as at template 16 for production riser 26 or at the platform with vertical riser 26 or with catenary risers 26A or 26B. Thus, it can be important that the monolithic stress joint must also provide for complex load connections which may prove difficult and expensive to fabricate from titanium.

Returning to FIG. 2, titanium tapered transition section 34 is formed for the illustrated embodiment with a first connection flange 100, a second connection flange 36, and a load connection flange 38. The top terminal end 40, beyond load connection 38 is beveled for a welded joint with another section of titanium alloy tubular goods having a second connection flange later in assembly of the monolithic isolation stress joint. Sections carrying first and second connection flanges are not attached until other components are in place as discussed below.

Figure 3:
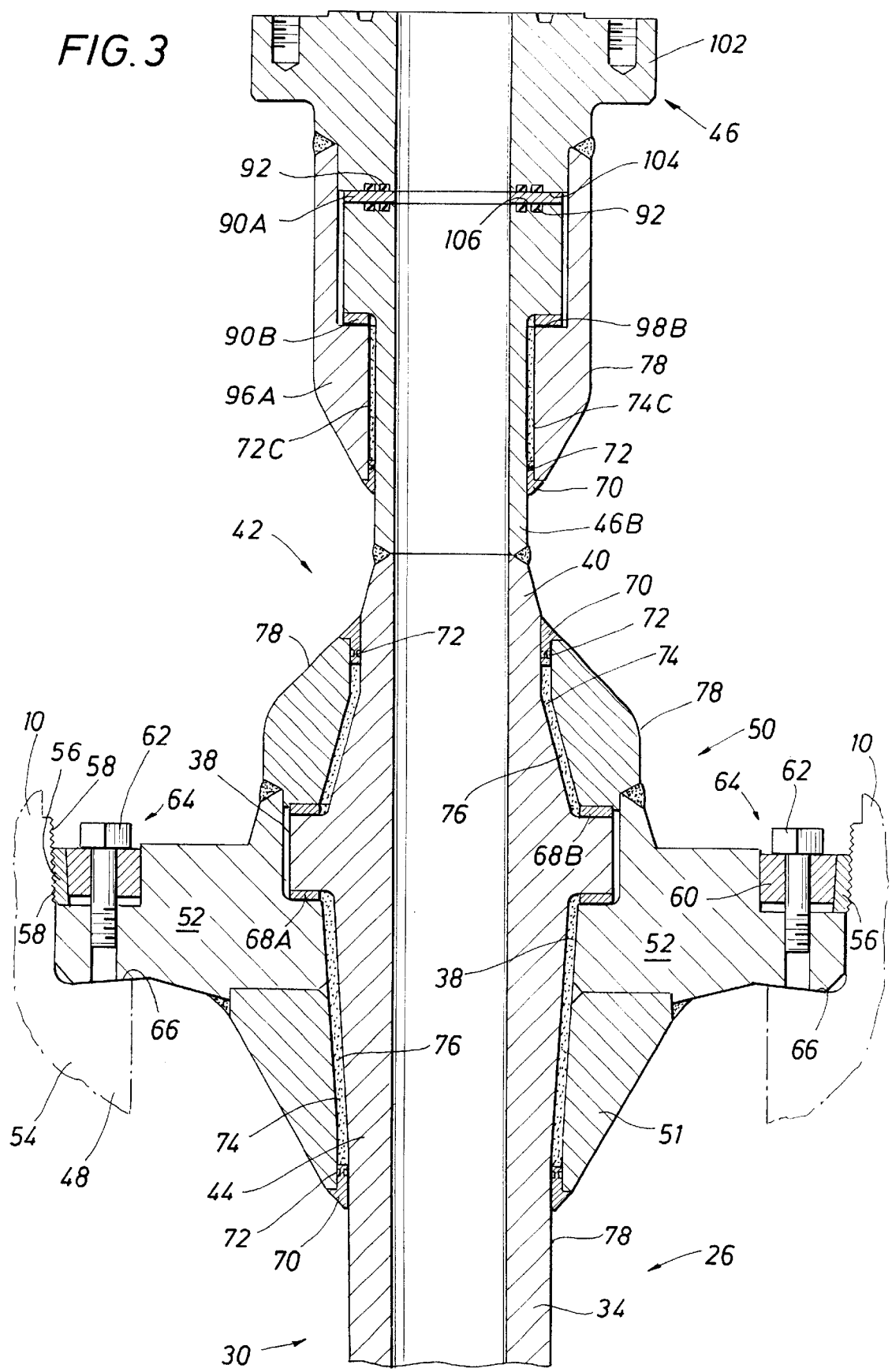
FIG. 3 is a cross section view of a first insulating joint in accordance with one embodiment of the present invention.

FIG. 3 is a cross section of first insulating joint assembly 42 and an insulating load connection 48. These connections provide for connecting the titanium alloy that provides the required flexure with cheaper and more easily fabricated steel alloys where such flexure performance is not required, and to do so while electrically isolating the titanium and steel from electrochemical reaction therebetween.

Insulated load connection 50 engages titanium tapered transition section 34 at load connection flange 38. In this embodiment, insulated load connection 50 has a steel load ring 52 which is rigidly secured to mounts 48 such a riser basket 54 (See FIG. 1) hung off of a pontoon of TLP 10A. Returning to FIG. 3, load connection flange 38 is provided with upper and lower gaskets 68A and 68B. The gaskets are electrically insulative and must be very resistant to cyclical and extreme compressive loads, e.g., formed from Zirconia or appropriate ceramic elements.

Collar 51 is fabricated with load ring 52 or, as illustrated here, welded thereon before insertion over first connection flange 36 and brought to position for bearing contact with load connection flange 38 through insulative gasket 68A. A collar cap 53 slides over the weld-ready beveled termination at then terminal end 40 and is brought to position for bearing contact with load connection flange 38 through insulative gasket 68B and is welded to load ring 52, securing the connection of load ring 52 about load connection flange 38 through electrically isolating, load bearing gaskets. Spacing is assured with insertion of rings or plugs 70 from a tough electrically isolating material such as DELRIN at the terminal entrances to annular space 74 between the titanium tapered transition section 34 and the surrounding elements of insulative load connection 50. Even where, as in this illustration, the load connection is deployed relatively high in the water column, special provisions may be desired to prevent seawater ingress from bringing the two electrochemically reactive metals into cathodic reaction. Plugs 70 include o-rings 72 to secure a water tight seal for annular space 74. Additional o-rings or may be provided for sealing out seawater or the annulus may be filled with a suitably electrically insulative epoxy or potting compound 76.

Similarly, an external coating 78 over the insulative joint which further separates the proximity of titanium to steel in seawater benefits the joint. Suitable coatings will be electrically insulative, will resistant water penetration and corrosion, and may further retard marine growth. The coating also helps protect the surface from nicks common in the normal course of handling which tend to produce stress concentrations on the monolithic stress joint. Coatings to extend the proximity in the interior of the conduit can provide further electrical chemical isolation.

FIG. 4 illustrates second insulative joint 80 which engages second connection flange 36 of titanium tapered transition section 34. See also FIG. 2. This joint is assembled before connection into the tapered transition section 34. Returning to FIG. 4, a steel riser joint termination 82 for connection to riser 26A is provided with sealing face 84 and prepared for a welded connection with bevels 86A to steel riser 26A bevels 86B for assembly of the second insulative joint. See FIG. 1. Returning to FIG. 4, electrically isolating gaskets 88 are deployed, e.g., from ceramic, between sealing face 84 of flexible joint termination 82 and sealing face 90A of first connection flange 36. Gaskets 88 are provided with pressure activated elastomeric seals 92. A further electrically isolating ceramic seal 94 is provided between bearing face 90B of first connection flange 36 and steel cap collar 96 and welds 98 secure cap collar 96 to riser joint termination 82. Again, an annular plug such as DELRIN plug 70 helps with spacing and having o-rings 72, electrically insulative epoxy or potting compound 76 in annulus 74 and external and internal coatings where titanium and steel are close together facilitates electrochemical isolation.

A titanium weld at beveled surface 99 then brings second insulative joint 80 into the monolithic stress joint by joining titanium first connection flange section 36A and titanium tapered transition section 34. Recall FIG. 2. This end of this embodiment of a monolithic stress joint provides a steel beveled edge 86A to accept a welded connection into a marine riser such as riser 26A.

Returning to FIG. 3, insulative joint 100 assembles the second titanium connection joint 39 with sealing faces (104 and 106), insulative gaskets (90A and 90B, seals 92, cap collars 96A, etc.) in a manner similar to the construction of insulative joint 80 discussed above, except that the outboard element for this application terminates in a steel flange 102 to accept a hard connection with top hang off piping of the platform. Insulative joint 100 is then assembled into the monolithic stress joint by a titanium weld between second connection flange section 46A and the titanium conduit above load connection 50.

FIG. 3 also illustrates the deployment of a electrically isolative monolithic stress joint in accordance with one option for a support system for receiving insulating load connection 50. Here steel load ring 52 of insulated load connection 50 is rigidly secured to mounts 48 such a riser basket 54 (See FIG. 1) hung off of a pontoon of TLP 1A. In the illustrated connection, the base of steel load ring 52 engages a negatively sloped load ring retainer ring 66 of mount 48 and is secured there with interference tie down mechanism 64 which uses a plurality of segmented locking dogs 56 having rings 58A corresponding with rings 58B on mounts 48 to retain the connection. Bolts 62 cause tapered edges of ring 60 to drive the corresponding rings 58A and 58B of dogs 56 and the walls of mounts 48 into secure engagement.

Other alternatives are available for supporting the load connection. For example, the stress joint at the lower end of production riser 26 will be secured against tension. Additional systems for supporting the load connection will be apparent to those having the teachings of this application and ordinary skill in the art.

Although illustrated in the context of steel and titanium alloys in offshore applications of tubular flow lines, the present invention is applicable to other applications where a material having advantageous flexure performance is deployed in a stress joint connecting to other materials that are electrochemically active therewith. For instance, the present invention might well contribute in offshore applications using tubular goods or "conduits" that are not flow lines, but mooring elements or tethers. Or other flow line applications besides offshore may require accommodating the range of relative motion addressed by such stress joints.

Other modifications, changes, and substitutions are also intended in the foregoing disclosure. Further, in some instances, some features of the present invention will be employed without a corresponding use of other features described in these illustrative embodiments. Accordingly, it is appropriate that the appended claims be construed broadly and in a manner consistent with the spirit and scope of the invention herein.

What is claimed is:

1. A monolithic isolation stress joint, comprising:
   a first conduit element;
   a first insulating joint assembly;
   a stress joint connected to the first conduit element through the first insulating joint, the stress joint being formed of a material which has advantageous elastic flexure characteristics but which is electrochemically active with respect to the first conduit element and which is electrically isolated therefrom with the first insulating joint;
   a second insulating joint assembly; and
   a second conduit element connected to the stress joint through the second insulating joint, the second conduit element being formed of a material which is electrochemically active with respect to the stress joint and which is electrically isolated therefrom with the second insulating joint.

2. A monolithic isolation stress joint in accordance with claim 1 wherein:
   the first and second conduits are formed of steel alloys; and
   the stress joint if formed of a titanium alloy.

3. A monolithic isolation stress joint in accordance with claim 2 wherein the titanium alloy is Ti6Al-4V ELI.

4. A monolithic isolation stress joint in accordance with claim 1 wherein the first and second conduits are segments of a marine riser.

5. A monolithic isolation stress joint in accordance with claim 4 wherein the marine riser is a catenary riser.

6. A monolithic isolation stress joint in accordance with claim 4 wherein the marine riser is a vertically suspended production riser.

7. A dynamic riser termination system for use in transporting well fluids to a platform in offshore hydrocarbon production operation applications, comprising:
   a termination element for transporting well fluids, said termination element being formed from a steel alloy and being substantially rigidly secured;
   a first insulating joint;
   a stress joint connected to the termination element through the first insulating joint, the stress joint being formed of a titanium alloy having advantageous elastic flexure characteristics but which is electrochemically active with respect to the termination element and which is electrically isolated therefrom by the first insulating joint;
   a marine riser connected to the stress joint through the second insulating joint; and
   the marine riser being formed of a steel alloy which is electrochemically active with respect to the stress joint and which is electrically isolated therefrom by the second insulating joint.

8. A dynamic riser termination system in accordance with claim 7 wherein the termination element is rigidly secured to the platform.

9. A dynamic riser termination system in accordance with claim 7 wherein the termination element comprises:
   a load connection, comprising:
      a steel load ring rigidly mounted to a riser basket on the platform;
      a titanium hub projecting a hang-off profile within the load ring; and
      a high strength, electrically insulative interface between the load ring and the titanium hub; and
   a pressure seal connection.

10. A dynamic riser termination system in accordance with claim 9, further comprising water exclusion seals between the load ring and the titanium hub.

11. A dynamic riser termination system in accordance with claim 10 wherein the water exclusion seals further comprises:
   DELRIN rings between the load ring and the titanium hub on either side of the high strength, electrically insulative interface;
   elastomeric o-rings sealing between the DELRIN rings and the titanium hub;
   elastomeric o-rings sealing between the DELRIN rings and the load ring; and
   water resistant, electrically insulative potting compound in the annulus between the load ring and the titanium hub in the span bounded by the DELRIN rings.

12. A dynamic riser termination system in accordance with claim 11 wherein the pressure seal connection is axially removed from the load connection and comprises:
   a second hang off profile projecting from the titanium hub;
   a second load ring, the second load ring surrounding the second hang off profile;
   a supplemental high strength, electrically insulative interface between the second load ring and the second hang off profile;
   an electrically insulative high pressure seal between the titanium hub and the second load ring; and
   a connection flange connected to the second load ring.

13. A dynamic riser termination system in accordance with claim 7 wherein the termination element is a subsea wellhead.

14. A dynamic riser termination system in accordance with claim 7 further comprising an external electrically insulative coating separating the proximity of steel to titanium in seawater.

15. A dynamic riser termination system in accordance with claim 7 further comprising an internal electrically insulative coating further separating the proximity of exposed steel and titanium on the interior of the riser.

16. A dynamic riser termination system in accordance with claim 7 wherein the riser is a catenary export riser.

17. A dynamic riser termination system in accordance with claim 7 wherein the riser is a catenary import riser.

18. A dynamic riser termination system in accordance with claim 7 wherein the riser is a vertically suspended production riser.

19. A dynamic riser termination system in accordance with claim 17 wherein the stress joint is applied at the bottom of the riser.

20. A dynamic riser termination system in accordance with claim 19 further comprising a second stress joint is applied at the top of the riser.

* * * * *